United States Patent [19]

Guest

[11] Patent Number: 5,375,893

[45] Date of Patent: Dec. 27, 1994

[54] THREADED MEMBERS

[76] Inventor: John D. Guest, "Iona", Cannon Hill Way, Bray, Maidenhead, Berkshire, United Kingdom

[21] Appl. No.: 11,481

[22] Filed: Jan. 26, 1993

[30] Foreign Application Priority Data

Jan. 31, 1992 [GB] United Kingdom ............... 9202044
Jul. 6, 1992 [GB] United Kingdom ............... 9214334

[51] Int. Cl.$^5$ ........................................... F16L 17/025
[52] U.S. Cl. ................................. 285/330; 285/347; 285/379; 285/910
[58] Field of Search ............. 285/353, 347, 910, 330, 285/23, 374, 349

[56] References Cited

U.S. PATENT DOCUMENTS

| 1,100,630 | 6/1914 | Toepperwein | 285/379 |
| 1,917,553 | 7/1933 | Scholtes | 285/379 X |
| 3,879,071 | 4/1975 | Gockler | 285/347 |
| 4,085,951 | 4/1978 | Morris | 285/347 X |
| 4,088,327 | 5/1978 | Bachle | 285/23 X |

FOREIGN PATENT DOCUMENTS

0459957 12/1991 European Pat. Off.
0482204  4/1992 European Pat. Off.
2252138  7/1992 United Kingdom.

*Primary Examiner*—Dave W. Arola
*Attorney, Agent, or Firm*—Baker & Daniels

[57] ABSTRACT

The disclosure relates to a threaded member having an annular groove which is of greater depth than the base of the adjacent thread. A resilient ring is mounted in the groove having an outer periphery extending above the base of the thread and a plurality of projections are formed at spaced locations around the ring to be deformed by the engagement of the threaded member with a corresponding threaded member to form a seal between the respective threads of the engaging members.

15 Claims, 3 Drawing Sheets

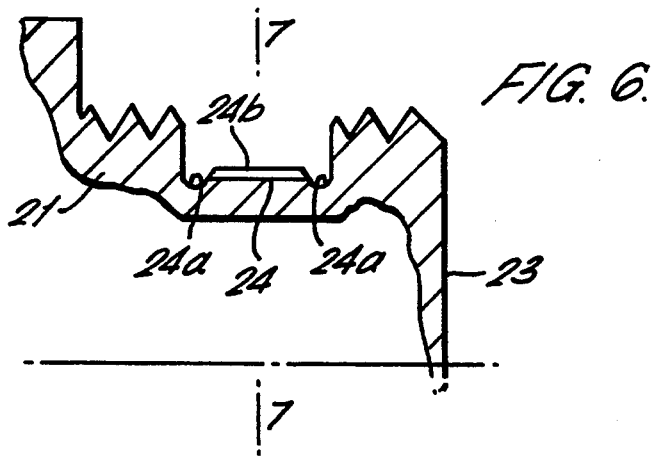
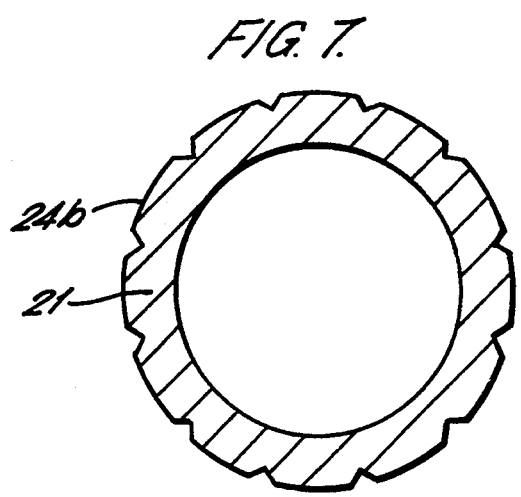
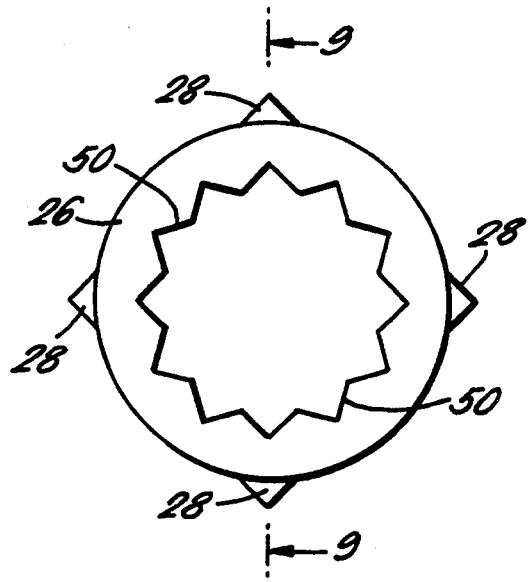
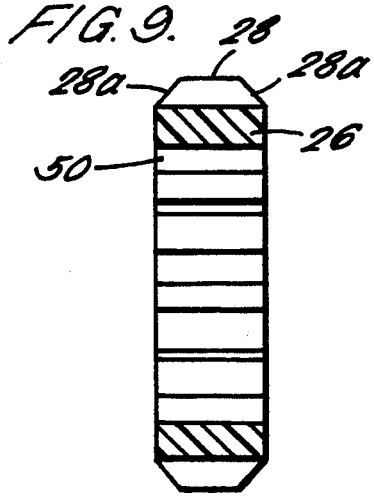
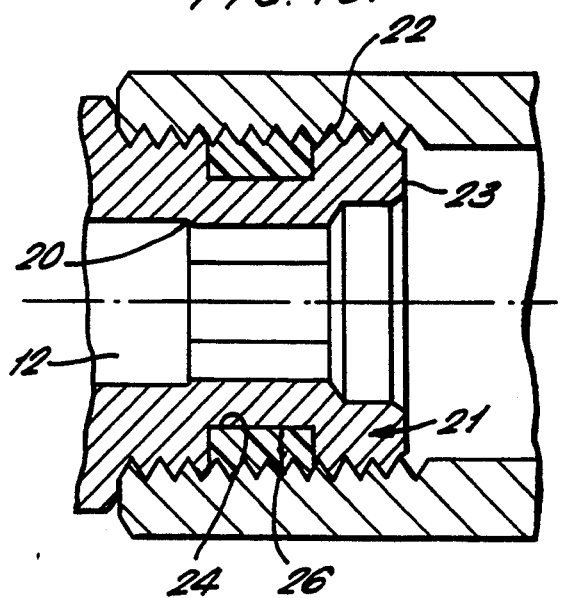

THREADED MEMBERS

BACKGROUND OF THE INVENTION

1. Field Of The Invention

This invention relates to threaded members and in particular to the sealing of threaded members. The invention is particularly applicable to threaded members on tube coupling bodies for providing a sealed connection of the bodies to further threaded components.

2. Background Prior Art

It is well known to provide on a threaded member a washer to act as a seal when the threaded member is screwed into a component. U.K. Patent Specification No. 1 218 644 and U.S. Pat. Nos. 3,027,042 and 3,366,504 disclose different forms of threaded members on which additional sealing layers are formed to create seals when the members are screwed into further components. It is an object of this invention to provide a thread seal which seals between two interengaging threaded components and which can readily be replaced when worn through use.

SUMMARY OF THE INVENTION

The invention provides a threaded member having an annular groove which is of greater depth than the base of the adjacent thread, a resilient ring mounted in the groove and having an outer periphery located above the base of the thread and a plurality of projections formed at spaced locations around the ring to be deformed by the engagement of the threaded member with a corresponding threaded member to form a seal between the respective threads of the engaging members.

Preferably the annular groove is formed part-way along the threaded member with the thread extending on either side of the groove.

It is further preferred that the outer periphery of the resilient ring lies just below the outer profile of the thread and the projections on the outer periphery extend above the profile of the thread.

In any of the above arrangements the projections may be tapered towards the entry end of the threaded member to provide a "lead-in" for a corresponding threaded member to be engaged therewith.

More specifically the projections may comprise ribs formed integrally with the resilient ring at spaced locations around the ring and extending parallel to the axis of the ring across the full face of the outer periphery of the ring, the ribs being tapered in both width and height to a point towards the entry end of the threaded member. The ribs may be triangular in cross-section through the axis of the ring.

The base of the annular groove containing the resilient ring may be knurled to grip with the inner face of the ring.

In any of the above arrangements the threaded member may be of parallel or tapered form. Also in any of the above arrangements the threaded member may be a male member having an external thread and external annular groove in which the seal is located to engage in a corresponding internally threaded female member or may be a female member having an internal thread and internal annular groove in which the resilient seal is located to receive an externally threaded male member.

The resilient ring may be formed from an elastomeric material and in the case where the invention is applied to an externally threaded male member is installed in the annular groove in the threaded member by stretching over the entry end of the threaded member to snap into the groove.

In accordance with a further feature of the invention the base of the groove may be undercut in one or both corners of the groove to form an encircling recess or recesses to accommodate deformation of the resilient sealing ring when said threaded members are engaged.

More specifically the base of the groove between the undercut corners thereof has axially extending splines and the inner periphery of the resilient ring is correspondingly splined to resist rotation of the ring with respect to the threaded member when the latter is engaged with the other threaded member. The splines may be of trapezoidal cross section.

According to a still further feature of the invention the projections on the outer periphery of the ring may extend parallel to the ring axis and may be tapered at one or both ends.

BRIEF DESCRIPTION OF THE DRAWINGS

FIG. 6 is a scrap section through a part of an externally threaded member taken along the axis of the member;

FIG. 7 is a section on the line 7—7 on FIG. 6;

FIG. 8 is an end view of a resilient ring for location on the threaded member;

FIG. 9 is a cross-section view on the line 9—9 on FIG. 8, and

FIG. 10 is a view of the connector of FIG. 1 screwed into a socket.

DESCRIPTION OF THE PREFERRED EMBODIMENTS

Figure 1:
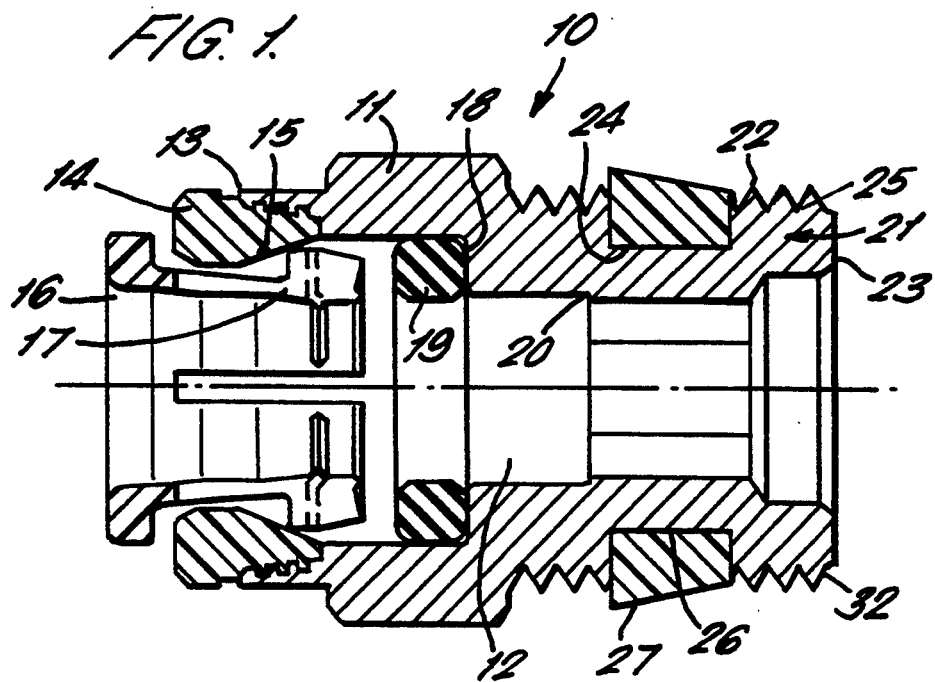
FIG. 1 is a general assembly view of a tube coupling having a sealed male form threaded connector.

FIG. 1 of the drawings shows a tube coupling connector indicated generally at 10 comprising a body 11 machined from brass or stainless steel and having a throughway 12. One end 13 of the body is fitted with a moulded plastics insert sleeve 14 formed with an internal tapered cam surface 15 reducing towards the open end of the body. An annular collet 16 is located in the insert having resilient fingers 17 engaging the cam surface to receive a tube to be locked in the body by the collet. The throughway is reduced in diameter at a first step 18 where an O-ring seal 19 is located and a second step 20 with which the end of the tube to be located in the body engages.

As indicated above, one end of the coupling body is adapted to receive a collet for connecting a tube in the coupling body. The other end of the coupling body indicated at 21 is a male form threaded member having an external parallel screw thread indicated at 22 and terminating in an end face 23. Part way along the screw thread, the coupling body is formed with a deep annular groove 24 the bottom of which lies below the bottom face of the thread indicated at 25. A resilient sealing ring 26 is disposed in the groove 24 formed from an elastomeric material such as a polyester.

Figure 2:
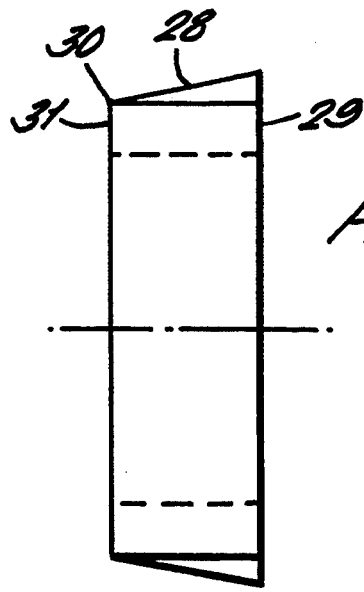
FIG. 2 is a side view of the seal of the threaded connector of FIG. 1.
Figure 3:
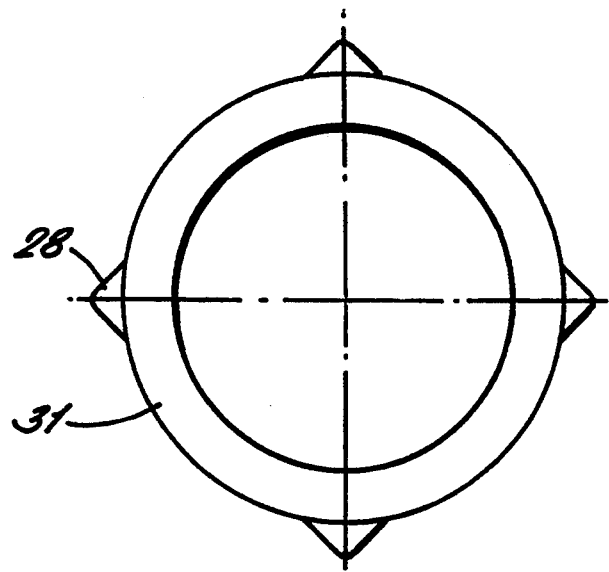
FIG. 3 is an end view of the seal.

The outer periphery 27 of the resilient ring lies just below the outer periphery of the thread and is formed at spaced locations around the ring with four axially extending ribs 28 integral with the ring as best seen in FIGS. 2 and 3. The ribs are of generally triangular cross-section as seen in a plane containing the axis of the ring and taper both in width and height from one end 29 of the ring where they project above the adjacent thread periphery to a point 30 at the other end 31 of the ring. The ring is installed in the annular groove with the tapered ends of the ribs adjacent the entry end of the screw thread, that is the end adjacent end 23 of the coupling body.

When the threaded end of the coupling body is screwed into a corresponding threaded socket in another component as shown in FIG. 10, the ribs of the sealing ring are initially engaged and deformed by the outer thread and then the thread bites into the outer periphery of the sealing ring itself to deform the ring to fill the gaps between the inner and outer threads. A seal is thereby created between the threads to prevent loss of fluid or air between the threads.

The resilient sealing ring 26 is formed as an injection moulding and is stretched and drawn over the threaded end of the coupling body to snap into the annular groove whilst still warm from its moulding operation. The outer periphery of the end 32 of the threaded member is bevelled as indicated at 24 to facilitate drawing the ring onto the threaded member. The internal diameter of the resilient ring is such that the ring grips around the base of the groove and the base may be knurled to provide a surface roughness to grip with the ring and thereby prevent the ring turning when the tube coupling body is screwed into the outer threaded component.

Conventionally, when a seal has to be provided between a threaded adapter and a component into which it is screwed, the bore in the component has to be enlarged to accommodate the seal and usually this entails enlarging the component itself. It will be appreciated that, with the above arrangement, because the seal is accommodated in the groove in the male adapter, no consequential increase in the size of the component in which the adapter is fitted is required.

Figure 4:
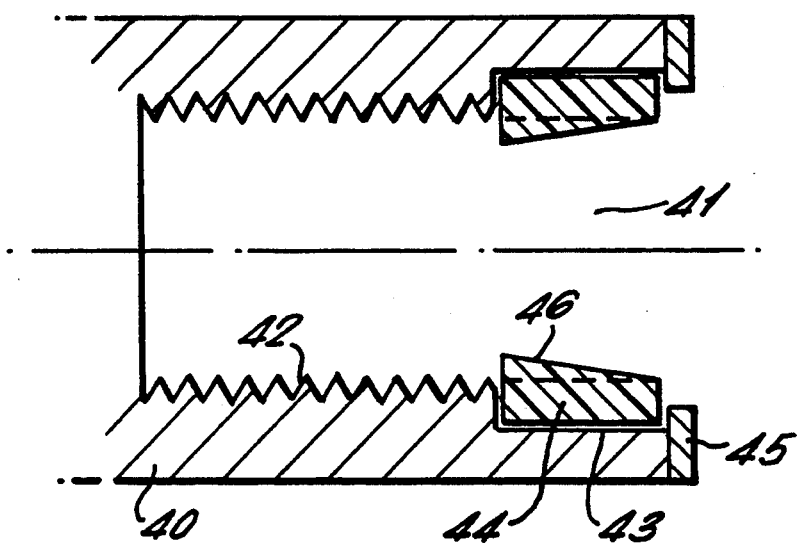
FIGS. 4 and 5 illustrate the application of the invention to female form threaded members.

Reference is now made to FIG. 4 of the drawings which illustrates the application of the invention to an internally threaded female member. The female member is in the form of a socket 40 having an open ended straight bore 41 formed with a parallel internal screw thread 42 to receive a threaded component to be secured in the bore. An annular groove 43 is formed around the open end of the bore to receive a resilient seal 44. The seal is held captive in the groove by an annular cover plate 45 secured to the end of the socket and overlying the adjacent end of the seal.

The seal is formed from an elastomeric material as before and has integral upstanding axial extending ribs 46 around its inner periphery. As before, the ribs are of triangular cross-section tapering towards the open end of the bore. When a male screw 30 component is inserted in the socket, the threads of the male component bite into the ribs 46 and the inner periphery of the seal and the resulting deformation of the material of the seal fully fills the thread at the male component to create a seal with the male component at the end of the socket.

Figure 5:
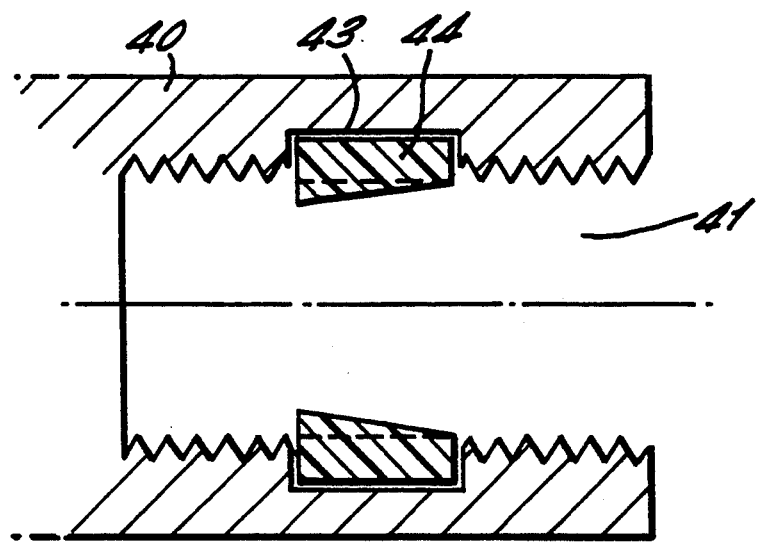

FIG. 5 of the drawings shows a similar arrangement except that the groove 43 is formed part-way along the bore 41 spaced from the open end thereof. In this case of course the separate annular cover plate 45 is not required.

Reference is now made to FIGS. 6 to 9 which illustrate a number of further modifications to the above constructions. Firstly, as shown in FIG. 6 the groove 24 is undercut at its corners to form recesses 24a encircling the groove to accommodate excess material of the resilient ring when it is deformed into the groove by engagement of the threaded members as described above.

The base of the groove 24 is formed with splines 24b extending parallel to the axis of the threaded member, the splines being of truncated triangular cross-section as best seen in FIG. 7.

The resilient ring 26 has an inner periphery formed with axially extending triangular-section grooves 50 to engage with the splines and prevent the ring rotating with respect to the threaded member when the threaded member is engaged in the corresponding other threaded component.

As shown in FIGS. 8 and 9 of the drawings, the ribs 28 on the outer periphery of the ring 26 are straight-cut with chamfered ends 28a (see FIG. 9) to allow the ring to be engaged from either end in the other threaded member.

I claim:

1. A first threaded member in threaded engagement with a second threaded member, each of said first and second threaded members having threads with a depth in a radial direction, said first threaded member comprising:

a body having an annular groove around the periphery thereof, said groove having a depth which is greater than said first threaded member thread depth; and a resilient ring disposed within said groove, said ring having a maximum depth which is greater than said annular groove depth and an outer periphery which is not disposed within said groove, said ring having a plurality of projections extending from and circumferentially spaced around said outer periphery, at least one of said projections and said outer periphery sealingly engaging threads of the second threaded member by completely filling a portion of the second threaded member threads disposed adjacent said ring.

2. A first threaded member as claimed in claim 1, wherein the annular groove is formed part-way along the threaded member with the threads extending on either side of the groove.

3. A first threaded member as claimed in claim 1, wherein the outer periphery of the ring lies just below an outer profile of the first threaded member threads and the projections on the outer periphery extend above the profile of the first threaded member threads.

4. A threaded member as claimed in claim 3, wherein the projections are tapered towards an entry end of the first threaded member to provide a lead-in for said second threaded member to be engaged therewith.

5. A threaded member as claimed in claim 4, wherein the projections comprise ribs formed integrally with the resilient ring and extending parallel to an axis of the ring across the outer periphery of the ring, the ribs being tapered in both width and height to a point towards the entry end of the first threaded member.

6. A threaded member as claimed in claim 5, wherein the ribs are triangular in cross-section through the axis of the ring.

7. A threaded member as claimed in claim 1, wherein the annular groove has a base which contains the resilient ring and is knurled to grip an inner face of the ring.

8. A threaded member as claimed in claim 1, wherein the first threaded member includes external screw threads defining an external periphery thereof which extends parallel to a longitudinal axis of the first threaded member.

9. A threaded member as claim in claim 1, wherein the first threaded member is a male member and the second threaded member is an internally threaded female member, said male member having external threads, and wherein said groove comprises an external annular groove in which the ring is located to engage said internally threaded female member.

10. A threaded member as claimed in claim 9, wherein the ring is comprised of an elastomeric material and is installed in the annular groove in the first threaded member by stretching over the entry end of the first threaded member to snap into the groove.

11. A threaded member as claimed in claim 1, wherein the first threaded member is a female member having internal threads and internal groove in which the resilient ring is located to receive an externally threaded male member.

12. A threaded member as claimed in claim 1, wherein the groove is undercut in at least one corner thereof to form an encircling recess to accommodate deformation of the ring when said first and second threaded members are engaged.

13. A threaded member as claimed in claim 12, wherein the groove is undercut in two corners thereof, and wherein a portion of the groove between the undercut corners has axially extending splines and an inner periphery of the ring is correspondingly splined to resist rotation of the ring relative to the first threaded member when the first threaded member is engaged with the second threaded member.

14. A threaded member as claimed in claim 13, wherein the groove splines and ring splines are of trapezoidal cross section.

15. A threaded member as claimed in claim 1, wherein the projections on the outer periphery of the ring extend parallel to an axis of the ring and are tapered at at least one end thereof.

* * * * *